United States Patent [19]
Boutillier et al.

[11] 3,879,505
[45] Apr. 22, 1975

[54] EXTRUSION OF FOAMABLE PLASTIC MATERIALS

[75] Inventors: Pierre Emile Boutillier, Colombes; Lucien Chaudot, Lyon, both of France

[73] Assignee: Societe Anonyme: Produits Chimiques Ugine Kuhlmann, Paris, France

[22] Filed: Jan. 23, 1973

[21] Appl. No.: 326,046

Related U.S. Application Data
[63] Continuation-in-part of Ser. No. 81,420, Oct. 16, 1970, abandoned.

[30] Foreign Application Priority Data
Oct. 22, 1969 France .................. 69.36308

[52] U.S. Cl. .............. 264/48; 264/46; 264/54; 264/55
[51] Int. Cl. .................. B29d 7/02; B29d 27/00
[58] Field of Search .............. 264/46, 48, 54, 55

[56] References Cited
UNITED STATES PATENTS

| | | | |
|---|---|---|---|
| 1,333,047 | 3/1920 | Valentine | 425/192 |
| 2,587,930 | 3/1952 | Uschmann | 264/171 |
| 2,682,292 | 6/1954 | Nagin | 264/174 |
| 2,941,964 | 6/1960 | Houston et al. | 264/51 |
| 3,038,205 | 6/1962 | Plummer | 264/177 R |
| 3,121,130 | 2/1964 | Wiley et al. | 264/53 |
| 3,300,554 | 1/1967 | Bachus | 264/55 |
| 3,374,300 | 3/1968 | Azuma | 264/46 |
| 3,413,387 | 11/1968 | Ohsol | 264/46 |
| 3,413,388 | 11/1968 | Lux et al. | 264/46 |
| 3,431,163 | 3/1969 | Gilbert | 264/48 |
| 3,431,164 | 3/1969 | Gilbert | 264/48 |
| 3,467,570 | 9/1969 | Baxter et al. | 264/46 |
| 3,523,988 | 8/1970 | Roehr et al. | 264/55 |
| 3,764,642 | 10/1973 | Boutillier | 264/47 |

FOREIGN PATENTS OR APPLICATIONS
971,352  9/1964  United Kingdom ............ 264/55

*Primary Examiner*—Ronald W. Griffin
*Attorney, Agent, or Firm*—Brumbaugh, Graves, Donohue & Raymond

[57] ABSTRACT

A process for manufacture by extrusion of profiled products of expanded plastic material is disclosed. A foamable thermoplastic composition is extruded through a die into a zone of lower pressure, said zone being defined by a "cylindrical" cooled surface parallel to the direction of extrusion, a part of this surface being in prolongation of a part of the die outlet perimeter. A foamed, thermoplastic extruded shape having a cellular core and a non-foamed, integral, thick skin on a longitudinally constant part of its surface is formed by the process.

2 Claims, 9 Drawing Figures

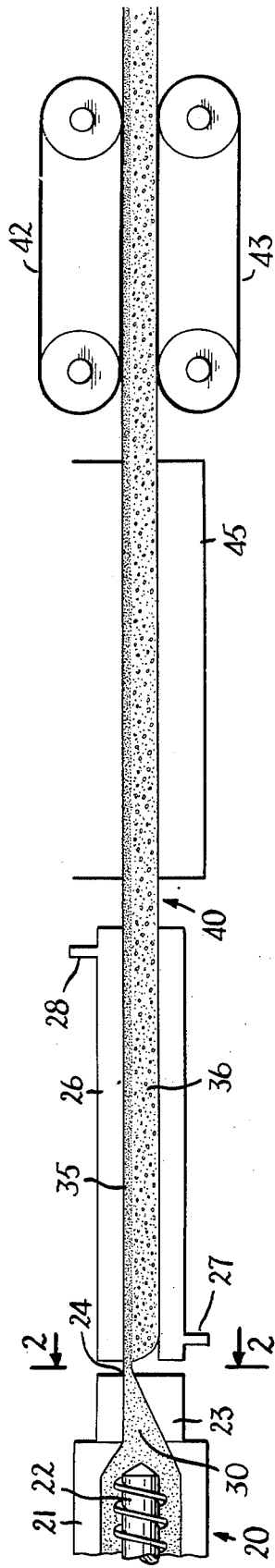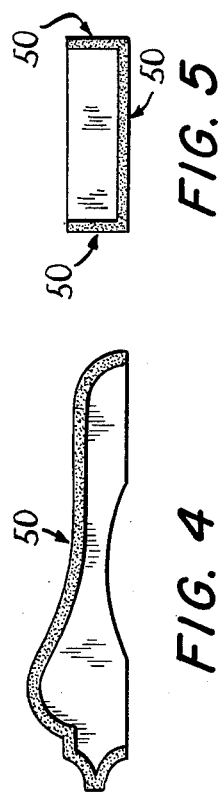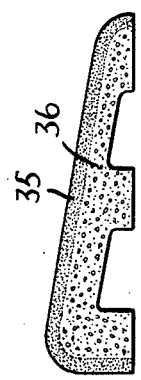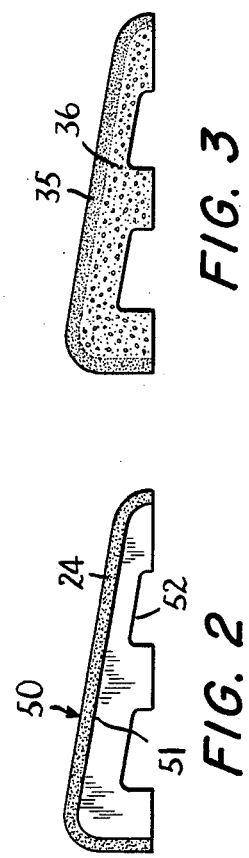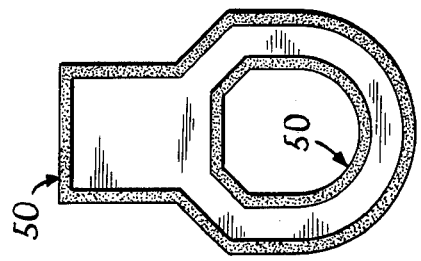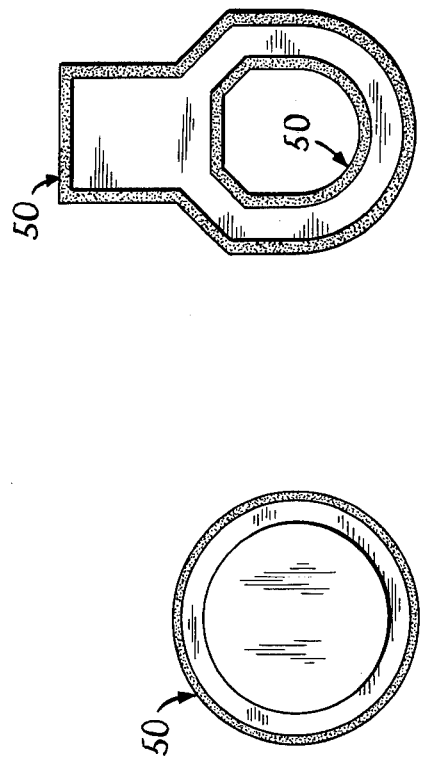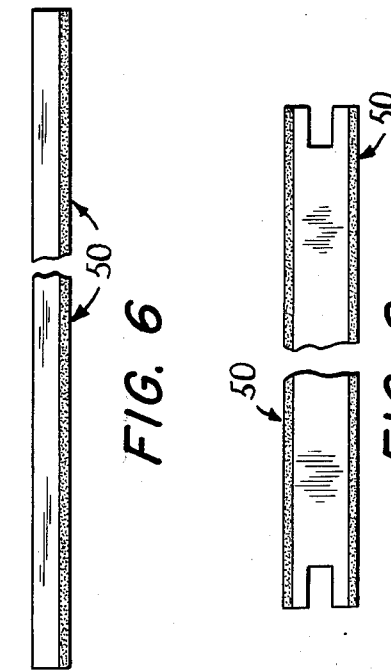

EXTRUSION OF FOAMABLE PLASTIC MATERIALS

CROSS REFERENCE TO RELATED APPLICATIONS

This is a continuation-in-part of U.S. Application Ser. No. 81,420, filed Oct. 16, 1970 now abandoned.

BACKGROUND OF THE INVENTION

This invention relates to the production of foamed thermoplastic extruded shapes (or bodies) having cellular cores and integral, non-foamed, thick skins on a longitudinally constant part of their surface. More particularly, it relates to an improved process for producing such shapes.

Thermoplastic foamed shapes are known in prior art and can be used in applications such as thermal insulation sheeting, pipes, moldings, panels for coating and siding walls, boards for carpentry, and furniture. Generally, existing processes allow one to make shapes of a simple configuration, having a large range of densities, some of which can be very low. Sometimes the shapes have a thin surface skin. Prior to the present invention, however, it has not been possible to produce such thermoplastic foamed shapes having at the same time very complicated configurations with straight, sharp angles, precise and constant configurations and sizes, and non-foamed integral thick skins. These properties are very desirable in shapes of this type and often are requisites for the desired use of the products. The thisk skin imparts to the extruded shapes good mechanical resistance, a pleasant smooth and glossy appearance, and the impermeability and corrosion properties of the conventional non-foamed thermoplastic material. The mechanical resistance is necessary so that the shapes can be used in structural applications and to permit them to be nailed, screwed, and stapled. Liquid and gas impermeability is very useful not only for weathering resistance, resistance to corrosive chemicals and other agents, but also for coating, painting and printing. The smooth appearance is necessary to get a shape with reproducible deep colors, and it also allows the producer to obtain by such pigmentation special shapes having the appearance of wood, marble, and the like.

Until now, the method typically used for producing foamed thermoplastic shapes consists of extruding a foamable thermoplastic composition through a normal die. The pressure drop at the outlet of the die allows the foaming agent to produce a large amount of gas either through chemical decomposition or physical vaporization so that the extruded shape expands in a direction at right angles to the direction of extrusion. This technology was improved by pulling the shape after cooling using endless belts such as is known in non-foamed extrusion processes. Such a technology has the disadvantages of producing shapes without integral, thick skins, with very poor surface appearances, and with many irregularities. Moreover, the shapes obtained do not have an exact, predetermined and constant configuration and size, and it is difficult, if not impossible to produce complicated configurations. When the material is allowed to expand freely upon leaving the die, the computation of the shape of the final product is highly complicated because the section of the die cannot be exactly homothetic to that of the profiled product to be obtained and has to be determined experimentally in each case.

Several techniques have been patented in different countries attempting to overcome the aforementioned difficulties. For example, in U.S. Pat. No. 3,300,554, the extruded shape is cooled before the completion of expansion by passing it through water to stop or at least limit expansion. This method does not give a thick, integral skin, however, and the surface is not smooth and regular.

In U.S. Pat. Nos. 3,121,130 and 3,374,300 processes of various degrees of complication are disclosed which extrude numerous closely spaced strands of foamable thermoplastic composition, allow the strands to expand and join together to form shapes, and if desired regulate the temperature of the extrudates, a certain distance after the die outlets. These processes cannot produce foamed shapes with non-foamed, thick, integral skins, however, since the surface of the extrudates remain hot and flexible (to allow foaming) after emerging from the die for a sufficient length of time in order to produce the necessary final shapes.

In U.S. Pat. Nos. 3,413,388 and 3,413,387, tubular bodies of foamable thermoplastic material are extruded and the subsequent expansion of the material forms solid shapes. The extrudates are allowed to expand freely. A compression step to coalesce the walls of the bore is often utilized. The surfaces of the extrudates are deformed after emergence from the die openings, however, and non-foamed, thick, integral skins are not and cannot be formed.

U.S. Pat. Nos. 3,431,163 and 3,431,164 describe processes allowing one to make simple-shaped foamed thermoplastic products consisting of a mass of substantially parallel, elongated cells oriented at right angles to an enclosing surface skin and exhibiting a density drop across the mass such that the density is lowest at the center and increases in an outward direction. The processes extrude foamable composition through a die orifice into a zone of lower pressure defined by stationary surfaces which are spaced gradually further apart from each other along the direction of extrusion and which are cooled sufficiently to solidify the mass in contact with them, thus creating frictional drag. However, these processes are described to produce only simple-shaped products. Cellular arrangement is non-isotropic which is not always a desirable feature, and the skins are not thick, integral and non-foamed. Instead, the skins are merely described as being foamed to a considerably lesser extent than the main inner mass; the skins are generally of a fibrous nature and oriented in the direction of extrusion, and very often, are peelable. These prior art processes cannot form thick, non-foamed skins because it is necessary that the skins be sufficiently flexible at the outlet of the expansion zone to undergo deformation from the direction of the stationary surface to the direction of the extrusion. Therefore, it is necessary to keep the skins comparatively warm all along the stationary surfaces making it difficult to avoid foaming in thicknesses larger than 0.1 mm. Moreover, the processes are difficult to control.

In addition, British Pat. No. 971,352 describes a process which produces foamed thermoplastic with a simple, shaped structure having a non-foamed skin. This is done by forming a non-expanded preform with the foamable composition at a temperature sufficiently low to avoid expansion, then, while maintaining at least two opposing walls of the structure at a temperature below the decomposition point of the blowing agent and preferably below the softening point of the composition, the structure is exposed to an alternating high frequency electrical field so that the body of the thermoplastic material between the walls is heated to a temperature above the decomposition point of the blowing agent. This process is limited to simple shapes and only to polar thermoplastics which can be heated by high frequency fields. Also, it is difficult to adapt this process to industrial and commercial production.

The above review of the prior art shows that it has not been heretofore possible to develop a commercial, industrial process able to make foamed thermoplastic shapes having at the same time complicated configurations, predetermined, reproducible and continuous sizes and dimensions, and a non-foamed, thick, integral skin on the parts of the cross sectional perimeter where desired.

SUMMARY OF THE INVENTION

The present process overcomes the above problems prevalent in the prior art. By using the present process, it is possible to produce foamed shapes having at the same time complicated configurations, predetermined, reproducible and continuous sizes and dimensions, and a non-foamed, thick, integral skin on the parts of the cross sectional perimeter where it is wanted. The location of the surfaces upon which the thick skins are produced and those upon which a thick skin is not produced can be specified as desired. Moreover, this process is relatively easy and inexpensive to operate, and it can utilize any thermoplastic material without change of tooling and with only adjustments of temperature in the extruder and die as required by the specific properties of the thermoplastic material being used.

In the process, a foamable thermoplastic composition is extruded through a die having one or more orifices, the total area of the orifices being only a fraction of the cross-sectional area of the desired final shape so that the foamable material undergoes a sufficient pressure drop at the outlet of the die to foam. The total area of the die outlet is inscribed in the actual cross sectional perimeter of the desired expanded shape and the perimeter of the die orifice coincides with the perimeter of the desired shape in every part of this perimeter where a non-foamed skin is desired. Then, the composition is allowed to foam immediately after the die into a low pressure zone defined by a "cylindrical" cooled surface having exactly the same cross section as the desired shape and positioned adjacent to the outlet of the die. The term "cylindrical" is used in this text in its broad mathematical definition which refers to a surface formed by a straight line, called "generating line," remaining parallel with itself and intersecting with a curved line called the "directrix." The "directrix" can be of any configuration. The generating straight lines defining this "cylindrical" surface are parallel with the direction of extrusion and the "cylindrical" surface is positioned in such a way that the part of the perimeter of the die orifice which connects with the perimeter of the desired shape is directly prolonged by the corresponding parts of the "cylindrical" surface.

Preferably, the product desired (and thus the die outlet and shaper channel) has at least two sides and two angles on its perimeter, the sides being either curved or straight. The product will have a thick skin across the full width of at least one of its sides, such side terminating at each of its ends by an angle.

The foamable thermoplastic composition is melted or softened in the extruder and the section and shape of the die and designed so that the pressure of the melt in the extruder at the temperature necessary to extrude the chosen thermoplastic material would be sufficient to avoid production of gas by the blowing agent, as described in U.S. Pat. Nos. 3,121,130 and 3,413,388.

Immediately after leaving the die, the melt expands by evolution of gas bubbles produced by volatilization or decomposition of the blowing agent. This expansion is directed at approximately right angles to the direction of extrusion and the foamed shape fills the totality of the zone defined by the cylindrical surface. The length and temperature of the cylindrical surface are sufficient to cool the surface of the foamed thermoplastic shape so that this surface leaves the cylindrical unit at a temperature lower than the softening point of the thermoplastic used. It is possible to finish the cooling of the foamed shape in a water tank and to use any typical method, such as endless belts, a drawing caterpillar or rools, to remove the shape from the apparatus. Adjustment and operation of the latter apparatuses used to assist in removing the extruded shapes are known in the art.

In particular, in the present process the part of the melt which leaves the die outlet and directly and immediately contacts the cooled cylindrical surface is immediately pressed against this cooled surface by expansion of the inside part of the melt and cooled below its softening temperature through contact with the cylindrical cooled surface.

The depth in the melt at which it is possible to prevent foaming is the depth which very quickly reaches a temperature lower than the blowing temperature of the thermoplastic foamable melt. In order to have the melt be cooled to a significant depth and therefore form a thick skin, it is necessary to have the temperature of the cylindrical surface very low. That means that the surface parts of the extruded body must be cooled to a temperature much lower than the softening temperature of the thermoplastic material. In this manner, the surface parts are, immediately and quickly after leaving the die, unable to undergo a further irreversible deformation. To prevent the extruded shapes from cracking they must be kept without deformation throughout the length of extrusion line.

The die orifice cross section can be any size and shape so long as the perimeter of the cross section is the same as the perimeter of the desired shape cross section in every part where a non-foamed skin is desired and the total cross section of the die orifice is inscribed in the perimeter of the desired shape cross section. The die may have one or several orifices, and the orifices may have any shape compatible with these conditions. Preferably, die orifices which are slot-shaped are utilized, one side of the slot having the shape and size of the part of cross sectional perimeter of the desired shape where a non-foamed skin is desired.

Also, it is preferred that the ratio between the total cross-sectional area of the die orifice (or orifices) and the cross-sectional area of the foamed shape is between three-fourth and one-twentyfifth and more preferably between one-half and one-eighth.

The cooled cylindrical surface can be any apparatus known to the prior art, such as a shaper or sizer with metallic walls, the cross section of which has the size and configuration of the desired shape. Such apparatus must have the exact size and configuration of the desired shape, must be parallel with the direction of extrusion, have a surface prolonging the parts of the die orifice perimeter which are the same as the parts of the perimeter of the cross section of the desired shape, and must be cooled sufficiently long to cool the surface of the existing shape to a temperature lower than the softening temperature of the thermoplastic which is used to make the shape.

Generally the efficient use of typical extrusion accessories such as a shaper the temperature of which is controlled by water or other fluid, is sufficient for the present process provided the temperature of the walls is controlled to a value lower than 100°C, and preferably as low as 60°C. Often it is preferable to cool the shaper walls to the lowest possible temperature, especially at its outlet end. Temperatures in the range of 0°C to 20°C are permissible. In order to compensate from the transverse shrinkage of the cooled shape, it is sometimes necessary to make the shaper channel of a conically converging configuration. This reduction of the cross-sectional area of the shaper is typically of the order of a fraction of 1%.

It is desirable to have a sharp temperature drop between the die and the shaper. This sharp drop can be obtained by the use of existing means. For example, it is possible to separate the inlet edge of the shaper and the outlet edge of the die by a non-heat conductive thin gasket. It is also possible to separate them by air but in that case the maximum distance between them must be less than 2 mm.

During normal operation for most thermoplastic materials and blowing agents, the temperature in the extruder and die is in the range from 50°C to 260°C. The temperatures vary considerably, however, depending on the termoplastic material and blowing agent utilized and it is within the skill of the art to formulate and determine the necessary temperatures for each material and use of the process.

The calculation of the various parameters determining the performance of the present process can be determined by anyone skilled in the art. Once the formulation of the foamable thermoplastic composition to be extruded has been settled, the determination of the parameters is restricted to the selection of conditions by calculation and/or experimentation. The parameters to be ascertained are, principally, the selection of the extrusion temperatures, the length of the shaper so that on leaving the latter the extrudate will have attained the desired temperature, the screw rotation speed and if required the pull rate of the extrudate.

Supplementary regulation of the expansion, also making it possible to control the thickness of the outer skin formed on the extruded material, may be achieved by raising or lowering the temperature of the die, mandrel, or walls of the shaper. This may be easily done, for example, by regulation of electric heating, by circulation of heating, or by circulation of a cooling fluid in these different parts.

Preferably, the skin should have a thickness in the range of 0.2 to 5.0mm.

BRIEF DESCRIPTION OF THE DRAWINGS

FIG. 1 is a longitudinal section view of the extrusion apparatus utilizable with the present process;

FIG. 2 is a cross-sectional view of FIG. 1 taken along lines 2—2;

FIG. 3 is a cross-sectional view of a shaped product obtained with the apparatus illustrated in FIG. 1; and FIGS. 4–9 illustrate examples of the numerous variations of shapes for die outlets and shaper channels for obtaining products by the use of the present invention.

DESCRIPTION OF THE PREFERRED EMBODIMENTS

FIG. 1 illustrates an apparatus which may be used for carrying out the invention. The apparatus comprises an extrusion machine 20 of any usual type, the extruder comprising a body 21, an extrusion worm or screw 22, of which only the end is shown, and a die 23.

Immediately adjacent the outlet 24 of the die 23 is a shaper 26 provided with connections 27 and 28 to permit circulation of a cooling fluid therein. The shaper 26 is positioned next to the die outlet 24. The inlet passage of the shaper 26 is larger than and completely circumscribes the die outlet 24. The shaper inlet and the die outlet are in axial alignment (close proximity) at least along a portion or side of their respective cross-sections.

The foamable thermoplastic material is melted in the extruder 20 forming a substantially non-expanded melt 30. The melt is driven by the worm 22 through the die outlet 24 and into the shaper 26.

The surfaces of the shaper are maintained at a temperature so that the part of the melt which immediately comes into contact with the shaper upon leaving the die outlet is sufficiently cooled to avoid blowing of the foaming agent at that part of the extrudate. The remaining portion of the melt expands into the cavity of the shaper and fills it, forming a core 36.

A thick, skin 35 is formed along the part of the extrudate which immediately contacts the surface of the cooled shaper 26. As the product 40 progresses through the shaper 26, a thick, hard skin 35 is obtained on that same portion of the product along its full length.

The product 40 is pushed through the shaper 26 by the pressure exerted on the skin 35 by the screw-worm 22. Often, a drawing caterpillar or similar apparatus is also utilized to assist in removing the product from the shaper 26. In FIG. 1, two endless belts 42 and 43 driven by motors (not shown) are utilized for this purpose. The removal apparatus is positioned downstream of the shaper and along the axis of extrusion.

To further cool the product 40 after extrusion, the product can be passed through a second cooling apparatus, such as the water tank 45 shown in FIG. 1.

FIG. 2 is a section along the line 2—2 of the tooling of FIG. 1. The die outlet 24 is indicated in the shaded area and consists of a thin slot defined by the two sides 50 and 51. The cross section of the cooled cylindrical surface of the shaper 26 is defined by lines 50 and 52 so that the entire surface of the die outlet 24 is inscribed in the perimeter of the cross section of the cylindrical surface, the line 50 common to the two cross sections.

FIG. 3 is a cross section of the final product obtained with the cooling of FIGS. 1 and 2. The size and configuration are the same as the cross section of the cylindrical surface of the shaper 26 and the shape has a non-foamed, smooth, hard, thick skin 35 at its surface produced along 50 of FIG. 2. It has a thin, dull, skin on other parts of its surface and the core 36 is cellular and uniformly foamed.

Although the cross-sectional configuration of FIG. 1 is shown as being that in FIGS. 2 and 3, it is understood that the present invention can be used with an unlimited number of various sizes and shapes of die outlets and shapes in order to obtain an unlimited number of shaped products.

FIGS. 4 to 9 illustrate further of the numerous different configurations and sizes of cross sections of die outlets and shapers which can be used in the process in order to produce final products of the same configuration and size as the shaper and having a non-foamed, hard, thick, skin on a part of their surfaces. FIG. 7 shows that a hollow or tubular product can be produced. FIG. 8 illustrates an embodiment wherein the die outlet is comprised of two separate parts. The final product formed by the configuration of FIG. 8 will have a hard, thick, smooth, shiny skin on two opposite surfaces. Such products can be used as wall materials and are useful in the construction industry.

It is also possible to extrude a many-sided product. For example, a hexagon-shaped product, having a thick skin on any one or more of its sides. A similar configuration is shown in FIG. 9.

The present process is not limited to any particular group of thermoplastic materials. Typical examples of thermoplastic materials which may be used in the process of the present application are:

a. Homopolymeric polystyrene resinous (thermoplastic mixtures attaining from 5 to 95% homopolymeric polystyrene and the balance being copolymers containing by random copolymerization of styrene and butadiene or by a grafting of styrene on a polybutadiene backbone;

b. Copolymers of styrene and/or styrene derivatives substituted on the nucleus or in an alpha position such as chloro or dichlorostyrene, vinyl-toluene, alpha-methyl-styrene, with one or more copolymerizable monomers such as acrylonitrile, methacrylonitrile, the acrylic and methacrylic acids as well as their alkyl esters, especially the methylic, ethylic and butylic esters;

The same copolymers improved in their resilience by addition of one or several elastomeric materials, such as acrylonitrile-butadiene-styrene (A.B.S.), copolymer styrene-acrylonitrile reinforced with a reticulated elastomer of acrylonitrile-butadiene or with the product of grafting acrylonitrile and styrene on a polybutadiene backbone;

c. Acrylic polymers, more particularly the homopolymers of methyl methacrylate and the copolymers of methyl-methacrylate with alkyl methacrylates and acrylates;

d. Homopolymers of vinyl chloride, the homopolymers of vinyl chloride that have been subjected, following polymerization, to a chemical reaction, such as postchlorination, in order to modify their properties, as well as the copolymers of vinyl chloride with one or more other copolymerizable monomers: the vinyl esters, such as vinyl acetate, vinylidene chloride, vinyl fluoride and vinylidene fluoride, a vinyl ester of aliphatic acid, the vinyl ethers, such as alkyl ether, and unsaturated acid such as acylic acid, methacrylic acid, crotonic acid, maleic acid, fumaric acid, undecenoic acid, metal salt or alkyl ester of such an acid, acrylonitrile or methacrylonitrile, olefins, such as ethylene, propylene or isobutylene, acrylamide or maleimide substituted or unsubstituted, vinylaromatic monomers;

The same homopolymers or copolymers the resilience of which has been improved by addition of one or more elastomers, for example polyvinyl chloride or copolymer of vinyl chloride reinforced with an elastomeric acrylonitrile-butadiene, a chlorinated polyethylene, the grafting product of vinyl chloride or acrylonitrile and styrene on polybutadiene or an acrylic saturated elastomer;

e. Polyolefins, especially the polyethylene of high density or of low density, the copolymers of ethylene and vinylacetate, for example in the ratios 80–20, the polypropylene and the resinous copolymers of ethylene, propylene and isobutylene;

f. Polyamides obtained either by simple polycondensation, for example from caprolactam or aminoundecanoic acid or a lauryl lactam, or by polycondensation or a diacid and a diamine, for example starting from hexamethylene diamine and adipic acid or sebacic acid, and the heteropolyamids;

g. Straight chain polyurethanes;

h. Cellulose derivatives, for example, cellulose esters such as cellulose monoacetate, hydroacetate and triacetate, cellulose acetobutyrate, and cellulose propionate, and cellulose ethers;

i. Straight chain polyesters, for example polyethyleneglycol terephthalate;

j. Homopolymeric or copolymeric polyacetals;

k. Polycarbonates;

l. Polyethers, such as polyphenylene oxide; and m. Vinyl ethers and vinyl esters.

Also, polymers derived from the preceding ones by blending, grafting, cross-linking, or co-polymerizing to improve one or more of their properties like thermal resistance, low temperature impact resistance, scratch resistance, and resistance to weathering and attack by chemicals can be used in the present process.

All blowing (foaming) agents can be used in this process. For example, it is possible to use chemical blowing agents such as organic or inorganic bicarbonates or oxalates, azo-chemicals, hydrazides, and amine nitrates. It is also possible to use low boiling liquids which can produce gas by vaporization in the lower pressure zone, such as carbon dioxide, aliphatic hydrocarbons like pentane, hexane, heptane, chlorinated and fluorinated aliphatic hydrocarbons like methylene chloride, dichloro-difluoromethane and monochloro-trifluoromethane. The preferred blowing agents are sodium acid carbonate (or sodium bicarbonate) azodicarbonamide (a nitrogen yielding organic compound), and trichloro fluoromethane and dichlorodifluoromethane (a liquid/gas type compound).

The manner used to mix the blowing agents and the thermoplastic materials are well-known by those skilled in the art. Generally chemical blowing agents are mixed with thermoplastic pellets or powders before introduction of the blend into the extruder. Low boiling liquids like pentane, hexane, and the like are mixed with monomers before the polymerization of the monomers to make thermoplastic material or are dissolved in thermoplastic powder. Others, like chloro-fluorinated hydrocarbons, are introduced in melted thermoplastic materials by pumping and metering them into the barrel of the extruder.

The foamable thermoplastic compositions used can also include products usually used in foamable compositions, like powdered or fibrous fillers, colorants, heat stabilizers, U.V. absorbers, anti-oxidants, plasticizers, lubricants, easy-processing agents, nucleating agents, and the like.

The following examples are given in order to practice the invention and to illustrate its general applicability; they are not meant to limit the invention in any manner.

EXAMPLE 1

In order to extrude a high impact polystyrene foamed moulding, the cross section of which is similar to FIG. 4 and having an area of 560 mm², the following composition is prepared in a high speed mixer:

| Component | Parts by weight |
|---|---|
| General purpose polystyrene beads (Dylene 8 of Sinclair-Koppers) | 70.0 |
| High impact polystyrene beads containing 10% by weight of polybutadiene (product of Sinclair Koppers) | 30.0 |
| Paraffin oil (SIDEPALINE 618 of GEERHART and MATTHIS) | 0.025 |
| Stearic acid | 0.1 |
| Sodium silico-aluminate (TIXOLEX 28 of SIFRANCE) | 0.5 |
| Sodium bicarbonate | 5.0 |

This composition is used in a single screw extruder of 40 mm diameter and 20 diameters length and is extruded through a die the outlet of which is represented by the shaded area shown in FIG. 4 and which has an area of 30 mm² so that the ratio between the cross-sectional area of the die and the foamed profile is 1/18.6.

Immediately after the die and parallel with the direction of extrusion, a metallic water-cooled shaper of constant cross section and of 720 mm length is placed directly in line with the die. The distance between the outlet edge of the die and the inlet edge of the shaper is 0.1 mm. The walls of the shaper are maintained at a temperature of 24°C. The remainder of the apparatus, after the shaper, is comprised of a water cooling tank and two powered endless belts which remove the profile from the extrusion line.

The temperature of the extruder barrel from the hopper to the die is controlled in three zones. The temperature in these zones are maintained at 150°C, 170°C, and 180°C, respectively, and the temperature of the die itself is maintained at 155°C.

By using the above-described composition and equipment, a moulding is produced which has an average density of 0.50 g/cm³ at an output rate of 11 kg/h. This moulding has a dense and smooth non-foamed skin of 1.5 mm thickness on the side of it which is indicated by the numeral 50 in FIG. 4. The remainder of its surface has only a partially foamed skin of approximately 0.1 mm thickness.

EXAMPLE 2

In order to extrude a polymethylmethacrylate foamed moulding, the cross section of which is similar to FIG. 4 and having an area of 560 mm², the following composition is prepared in a high speed mixer:

| Component | Parts by Weight |
|---|---|
| Polymethylmethacrylate beads (ALTULITE MBP of ALTULOR) | 100 |
| Paraffin Oil (SIDEPALINE 681 of GEERHART and MATTHIS) | 0.05 |
| Sodium Bicarbonate | 5 |

This composition is used in a single screw extruder of 40 mm diameter and 20 diameters length and is extruded through a die the outlet of which is represented by the shaded area as shown in FIG. 4 and which has an area of 150 mm² so that the ratio between the cross-sectional areas of the die and the foamed profile is 1/3.7.

Immediately after the die and parallel with the direction of extrusion, a metallic water-cooled shaper of constant cross section and of 720 mm length is placed directly in line with the die. The distance between the outlet edge of the die and the inlet edge of the shaper is 0.2 mm. The walls of the shaper are maintained at a temperature of 24°C. The remainder of the apparatus, after the shaper, is comprised of a water cooling tank and two powered endless belts which remove the profile from the extrusion line.

The temperature of the extruder barrel from the hopper to the die is controlled in three zones. The temperature in these zones are maintained at 125° C, 150° C, and 155° C, respectively, and the temperature of the die itself is maintained at 135° C.

By using the above described composition and equipment, a moulding is produced which has an average density of 0.60 g/cm³ at an output rate of 12.5 kg/h. This moulding has a dense and smooth non-foamed skin of 0.6 mm thickness on the side of it which is indicated by the numeral 50 in FIG. 4. The remainder of its surface has only a partially foamed skin of approximately 0.1 mm thickness.

EXAMPLE 3

In order to extrude a high impact polyvinylchloride foamed moulding, the cross section of which is illustrated in FIG. 3 and having an area of 460 mm², the following composition is prepared in a high speed mixer:

| Component | Parts by Weight |
|---|---|
| High impact PVC powder (Vinnol K 510/60 of Wacker-Chemie) | 92 |
| Acrylonitrile-styrene copolymer (CELUKAVIT N of Produits Chimiques Ugine Kuhlmann) | 8 |
| Baryum-Cadmium Laurate (MARK WS of ARGUS) | 2.5 |
| Organic Phosphate (MARK C of ARGUS) | 0.5 |
| Lubricative wax (OZECIRE 162 p of CIRES et DERIVES) | 0.3 |
| Calcium stearate | 0.5 |
| Sodium bicarbonate | 5 |

This composition is used in a single screw extruder of 40 mm diameter and 20 diameters length and is extruded through a die the outlet of which is represented by the shaded area shown in FIG. 2 and which has an area of 110 mm² so that the ratio between the cross-sectional areas of the die and the foamed profile is 1/4.2.

Immediately after the die and parallel with the direction of extrusion, a metallic water-cooled shaper of constant cross section and of 720 mm length is placed directly in line with the die. The distance between the outlet of the die and the inlet edge of the shaper is 0.1 mm. The walls of the shaper are maintained at a temperature of 55° C. The remainder of the apparatus, after the shaper, is comprised of a water cooling tank and two powered endless belts which remove the profile from the extrusion line.

The temperature of the extruder barrel from the hopper to the die is controlled in three zones. The temperature in these zones are maintained at 150° C, 185° C, and 190° C, respectively, and the temperature of the die itself is maintained at 160° C.

By using the above described composition and equipment, a moulding is produced which has an average density of 0.50 g/cm$^3$ at an output rate of 17 kg/h. This moulding has a dense and smooth non-foamed skin of 1.0 mm thickness on the side of it which is indicated by the number 50 in FIG. 3. The remainder of its surface has only a partially formed skin of approximately 0.1 mm thickness.

EXAMPLE 4

In order to extrude a polystyrene foamed rectangular panel, the cross section of which is similar to FIG. 6 and having an area of 2,700 mm$^2$ (450 mm × 6 mm), the following composition is prepared in a high speed mixer:

| Component | Parts by Weight |
| --- | --- |
| General purpose polystyrene beads (Dylene 8 of Sinclair-Koppers) | 100 |
| Paraffin Oil (SIDEPALINE 618 of GEERHART and MATTHIS) | 0.1 |
| Citric acid | 0.3 |
| Sodium Bicarbonate | 0.4 |

This composition is used in a single screw extruder of 90 mm diameter and 36 diameters length and is extruded through a die the outlet of which is represented by the shaded area shown in FIG. 6 and which has an area of 900 mm$^2$ so that the ratio between the cross-sectional areas of the die and the foamed profile is 1/3.0. Approximately in the middle of the extruder barrel, a special metering device allows to continuously introduce a blend of 75% by weight of dichlorodifluoromethane and 25% by weight of chlorotrifluoromethane at a rate of 2% by weight of the polystyrene composition.

Immediately after the die and parallel with the direction of extrusion, a metallic water-cooled shaper of constant cross section and of 1,000 mm length is placed directly in line with the die. The distance between the outlet edge of the die and the inlet edge of the shaper is 0.1 mm. The walls of the shaper are maintained at a temperature of 50° C. The remainder of the apparatus, after the shaper, is comprised of a water cooling tank and two powered endless belts which remove the profile from the extrusion line.

The temperature of the extruder barrel from the hopper to the die is controlled in six zones. The temperature in these zones are maintained at 155° C, 180° C, 200° C, 210° C, 143° C, and 100° C, respectively, and the temperature of the die itself is maintained at 135° C.

By using the above described composition and equipment, a panel is produced which has an average density of 0.37 g/cm$^3$ at an output rate of 73 kg/h. This panel has a dense and smooth non-foamed skin of 0.5 mm thickness on the side of it which is indicated by the numeral 50 in FIG. 6. The remainder of its surface has no substantial skin.

EXAMPLE 5

In order to extrude an acrylonitrile-styrene copolymer foamed board, the cross section of which is similar to FIG. 8 and having an area of 1,730 mm$^2$, the following composition is prepared in a high speed mixer:

| Component | Parts by Weight |
| --- | --- |
| Acrylonitrile styrene copolymer pellets (DIKARYL of Etablissements Kuhlmann) | 100 |
| Paraffin Oil (SIDEPALINE 618 of GEERHART and MATTHIS) | 0.1 |
| Stearic acid | 0.1 |
| Sodium bicarbonate | 3 |

This composition is used in a single screw extruder of 60 mm diameter and 20 diameters length and is extruded through a die having two orifices the outlet of which is represented by the shaded area shown in FIG. 8 and which has a total area of 500 mm$^2$ so that the ratio between the cross-sectional areas of the die and the foamed profile is 1/3.4

Immediately after the die and parallel with the direction of extrusion, a metallic water-cooled shaper of constant cross section and of 1,000 mm length is placed directly in line with the die. The distance between the outlet edge of the die and the inlet edge of the shaper is 0.3 mm. The walls of the shaper are maintained at a temperature of 35° C. The remainder of the apparatus, after the shaper, is comprised of a water cooling tank and two powered endless belts which remove the profile from the extrusion line.

The temperature of the extruder barrel from the hopper to the die is controlled in three zones. The temperature in these zones are maintained at 180° C, 200° C, and 220° C, respectively, and the temperature of the die itself is maintained at 180° C.

By using the above described composition and equipment, a grooved board is produced which has an average density of 0.65 g/cm$^3$ at an output rate of 30 kg/h. This board has a dense and smooth non-foamed skin of 0.5 mm thickness on its two main sides which are indicated by the numeral 50 in FIG. 8. The remainder of its surface has only a partially foamed skin of approximately 0.15 mm thickness.

EXAMPLE 6

The same condition as in Example 5 are used except that the distance between the outlet edge of the die and the inlet edge of the shaper is 2.0 mm.

The same grooved board is obtained but, on the two main sides, the skin is very slightly foamed and its thickness is only 0.3 mm. Also, the output rate is only 20 kg/h.

EXAMPLE 7

In order to extrude a rigid polyvinylchloride foamed rectangular shape, the cross section of which is similar to FIG. 5 and having an area of 300 mm², the following composition is prepared in a high speed mixer:

| Component | Parts by Weight |
|---|---|
| Suspension PVC powder (K—value = 55) | 95 |
| Acrylonitrile-styrenecopolymer (CELUKAVIT N of Produits Chimiques Ugine Kuhlmann) | 5 |
| Dibasic lead stearate | 1.0 |
| Dibasic lead phosphate | 3.0 |
| Paraffin oil (SIDEPALINE 618 of GEERHART and MATTHIS) | 0.025 |
| Calcium stearate | 1.0 |
| Lubricating wax (OZECIRE 162 P of CIRES et DERIVES) | 0.3 |
| p. p' oxy bis (Benzene sulfonyl semi carbazide)(Celogen BH of Uniroyal) | 1.0 |

This composition is used in a single screw extruder of 40 mm diameter and 20 diameters length and is extruded through a die the outlet of which is represented by a shaded area shown in FIG. 5 and which has an area of 75 mm² so that the ratio between the cross-sectional areas of the die and the foamed profile is 1/4.0.

Immediately after the die and parallel with the direction of extrusion, a metallic water-cooled shaper of constant cross section and of 1,000 mm length is placed directly in line with the die. The distance between the outlet edge of the die and the inlet edge of the shaper is 0.1 mm. The walls of the shaper are maintained at a temperature of 55° C. The remainder of the apparatus, after the shaper, is comprised of a water cooling tank and two powered endless belts which remove the profile from the extrusion line.

The temperature of the extruder barrel from the hopper to the die is controlled in three zones. The temperature in these zones are maintained at 160°C, 185°C, and 195°C, respectively, and the temperature of the die itself is maintained at 165° C.

By using the above described composition and equipment, a rectangular shape is produced which has an average density of 0.70 g/cm³ at an output rate of 9 kg/h. This shape has a dense and smooth non-foamed skin of 0.4 mm thickness on three of its sides which are indicated by the numeral 50 in FIG. 5. The remaining side has only a partially foamed skin of approximately 0.1 mm thickness.

EXAMPLE 8

In order to extrude a high density polyethylene foamed pipe of 159 mm outside diameter and 124 mm inside diameter, the cross section of which is similar to FIG. 7, the following composition is prepared in a high speed mixer:

| Component | Parts by Weight |
|---|---|
| High density polyethylene fluff (MI = 0.2) | 100 |
| Paraffin oil (SIDEPALINE 618 of GEERHART and MATTHIS) | 0.05 |
| Glycerol monostearate | 0.1 |
| Sodium Silico-aluminate (TIXOLEX 28 of SIFRANCE) | 0.5 |
| Sodium bicarbonate | 5 |

This composition is used in a twin screw extruder of 80 mm diameter and 15 mm diameters length and is extruded through a die the outlet of which is represented by the shaded area shown in FIG. 7 and which has an area of 730 mm² so that the ratio between the cross-sectional areas of the die and the foamed profile is 1/4.5.

Immediately after the die and parallel with the direction of extrusion, a metallic water-cooled shaper of constant cross-section and consisting of an external part of 160 mm inside diameter and 600 mm length and an internal part of 125 mm outside diameter and 1,000 mm length is placed directly in line with the die. The outlet edge of the die and the inlet edge of the two parts of the shaper are joined by means of two thermal insulating gaskets of 3 mm thickness. The walls of the shaper are maintained at a temperature of 45° C. The remainder of the apparatus, after the shaper, is comprised of a water cooling tank and two powered endless belts which remove the profile from the extrusion line.

The temperature of the extruder barrel from the hopper to the die is controlled in three zones. The temperature in these zones are maintained at 140°C, 165°C, and 185°C, respectively, and the temperature of the die itself is maintained at 145°C.

By using the above described composition and equipment, a pipe is produced which has an average density of 0.72 g/cm³ at an output rate of 50 kg/h. This pipe has a dense and smooth non-foamed skin of 3.0 mm thickness on its outside surface which is indicated by the numeral 50 in FIG. 7. Its inside surface has only a partially foamed skin of approximately 0.1 mm thickness.

EXAMPLE 9

In order to extrude a low density polyethylene foamed rectangular shape, the cross section of which is similar to FIG. 5 and having an area of 300 mm², the following composition is prepared in a high speed mixer:

| Component | Parts by Weight |
|---|---|
| Low density polyethylene powder (M.I. = 1.8) | 100 |
| Paraffin oil (SIDEPALINE 618 of GEERHART and MATTHIS) | 0.1 |
| Aminoguanidine bicarbonate (Carbobull of Produits Chimiques Ugine Kuhlmann) | 0.5 |
| Azodicarbonamide | 1 |

This composition is used in a single screw extruder of 40 mm diameter and 20 diameters length and is extruded through a die the outlet of which is represented by the shaded area shown in FIG. 5 and which has an area of 200 mm² so that the ratio between the cross-sectional areas of the die and the foamed profile is 1/1.5.

Immediately after the die and parallel with the direction of extrusion, a metallic water-cooled shaper of constant cross section and of 1,000 mm length is placed directly in line with the die. The distance between the outlet edge of the die and the inlet edge of the shaper is 0.1 mm. The walls of the shaper are maintained at a temperature of 15° C. The remainder of the apparatus, after the shaper, is comprised of a water cooling tank and two powered endless belts which remove the profile from the extrusion line.

The temperature of the extruder barrel from the hopper to the die is controlled in three zones. The temperature in these zones are maintained at 125° C, 138° C, and 160° C, respectively, and the temperature of the die itself is maintained at 115° C.

By using the above described composition and equipment, a rectangular shape is produced which has an average density of 0.39 g/cm³ at an output rate of 7 kg/h. This shape has a dense and smooth non-foamed skin of 0.6 mm thickness on three of its sides which are indicated by the numeral 50 in FIG. 5. The remaining side has only a partially foamed skin of approximately 0.1 mm thickness.

EXAMPLE 10 In order to extrude an acrylonitrile-butadiene-styrene-terpolymer (ABS) rectangular shape, the cross section of which is similar to FIG. 5 and having an area of 300 mm², the following composition is prepared in a high speed mixer:

| Component | Parts by Weight |
| --- | --- |
| ABS powder (UGIKRAL SF of Plastimer) | 95 |
| Acrylonitrile-styrene copolymer (CELUKAVIT N of Produits Chimiques UGINE KUHLMANN) | 5 |
| Paraffin oil (SIDEPALINE 618 of GEERHART and MATTHIS) | 0.1 |
| Calcium stearate | 0.2 |
| Ditertiobutyl paracresol | 0.2 |
| Sodium silico-aluminate (TIXOLEX 28 of SIFRANCE) | 0.1 |
| Azodicarbonamide | 1 |

This composition is used in a single screw extruder of 40 mm diameter and 20 diameters length and is extruded through a die the outlet of which is represented by the shaded area shown in FIG. 5 and which has an area of 75 mm² so that the ratio between the cross-sectional areas of the die and the foamed profile is 1/4.0.

Immediately after the die and parallel with the direction of extrusion, a metallic water-cooled shaper of constant cross section and of 1,000 mm length is placed directly in line with the die. The distance between the outlet edge of the die and the inlet edge of the shaper is 0.1 mm. The walls of the shaper are maintained at a temperature of 30° C. The remainder of the apparatus, after the shaper, is comprised of a water cooling tank and two powered endless belts which remove the profile from the extrusion line.

The temperature of the extruder barrel from the hopper to the die is controlled in three zones. The temperature in these zones are maintained at 150°C, 175°C, and 190°C, respectively, and the temperature of the die itself is maintained at 160°C.

By using the above-described composition and equipment, a rectangular shape is produced which has an average density of 0.40 g/cm³ at an output rate of 8.5 kg/h. This shape has a dense and smooth non-foamed skin of 0.4 mm thickness on three of its sides which are indicated by the numeral 50 in FIG. 5. The remainder side has only a partially foamed skin of approximately 0.1 mm thickness.

EXAMPLE 11

In order to extrude a polyamide foamed rectangular shape, the cross section of which is similar to FIG. 5 and having an area of 300 mm², the following composition is prepared in a high speed mixer:

| Component | Parts by Weight |
| --- | --- |
| Polyamide 11 pellets (RILSAN BES HVO of ATO Plastiques) | 100 |
| Paraffin oil (SIDEPALINE 618 of GEERHART and MATTHIS) | 0.05 |
| Sodium bicarbonate | 1.0 |

This composition is used in a single screw extruder of 40 mm diameter and 20 diameters length and is extruded through a die the outlet of which is represented by the shaded area shown in FIG. 5 and which has an area of 75 mm² so that the ratio between the cross-sectional areas of the die and the foamed profile is 1/4.0.

Immediately after the die and parallel with the direction of extrusion, a metallic water-cooled shaper of constand cross section and of 1,000 mm length is placed directly in line with the die. The distance between the outlet edge of the die and the inlet edge of the shaper is 0.1 mm. The walls of the shaper are maintained at a temperature of 50°C. The remainder of the apparatus, after the shaper, is comprised of water cooling tank and two powered endless belts which remove the profile from the extrusion line.

The temperature of the extruder barrel from the hopper to the die is controlled in 3 zones. The temperatures in these zones are maintained at 135°C, 160°C and 178°C, respectively, and the temperature of the die itself is maintained at 175°C.

By using the above-described composition and equipment, a rectangular shape is produced which has an average density of 0.48 g/cm³ at an output rate of 8 kg/h. This shape has a dense and smooth non-foamed skin of 0.5 mm thickness of three of its sides which are indicated by the numeral 50 in FIG. 5. The remainder side has no substantial skin.

EXAMPLE 12

In order to extrude a polypropylene foamed rectangular shape, the cross section of which is similar to FIG. 5 and having an area of 300 mm², the following composition is prepared in a high speed mixer:

| Component | Parts by Weight |
| --- | --- |
| Polypropylene powder | 100 |
| Paraffin oil (SIDEPALINE 618 of GEERHART and MATTHIS) | 0.05 |
| Dibasic lead stearate | 0.5 |
| Sodium silico-aluminate (TIXOLEX 28 of SIFRANCE) | 0.1 |
| Azodicarbonamide | 0.5 |

This composition is used in a single screw extruder of 40 mm diameter and 20 diameters lengths and is extruded through a die the outlet of which is represented by the shaded area shown in FIG. 5 and which has an area of 75 mm² so that the ratio between the cross-sectional areas of the die and the foamed profile is 1/4.0.

Immediately after the die and parallel with the direction of extrusion, a metallic water-cooled shaper of constant cross section and of 1,000 mm length is placed directly in line with the die. The distance between the outlet edge of the die and the inlet edge of the shaper is 0.1 mm. The walls of the shaper are maintained at a temperature of 80°C. The remainder of the apparatus after the shaper, is comprised of a water cooling tank and two powered endless belts which remove the profile from the extrusion line.

The temperature of the extruder barrel from the hopper to the die is controlled in three zones. The temperature in these zones are maintained at 160°C, 178°C, and 190°C, respectively, and the temperature of the die itself is maintained at 165°C.

By using the above-described composition and equipment, a rectangular shape is produced which has an average density of 0.47 g/cm³ at an output rate of 7.0 kg/h. This shape has a dense and smooth non-foamed skin of 0.8 mm thickness of three of its sides which are indicated by the numeral 50 in FIG. 5. The remainder side has only a partially foamed skin of approximately 0.1 mm thickness.

EXAMPLE 13

In order to extrude a polycarbonate foamed rectangular shape, the cross section of which is similar to FIG. 5 and having an area of 300 mm², the following composition is prepared in a high speed mixer:

| Component | Parts by Weight |
| --- | --- |
| Polycarbonate pellets (MAKROLON K 3200 of Bayer) | 100 |
| Paraffin oil (SIDEPALINE 618 of GEERHART and MATTHIS) | 0.05 |
| Azodicarbonamide | 1.0 |

This composition is used in a single screw extruder of 40 mm diameter and 20 diameters length and is extruded through a die the outlet of which is represented by the shaded area shown in FIG. 5 and which has an area of 150 mm² so that the ratio between the cross-sectional areas of the die and the foamed profile is 1/2.0.

Immediately after the die and parallel with the direction of extrusion, a metallic water-cooled shaper of constant corss section and of 1,000 mm length is placed directly in line with the die. The distance between the outlet edge of the die and the inlet edge of the shaper is 0.1 mm. The walls of the shaper are maintained at a temperature of 30°C. The remainder of the apparatus, after the shaper, is comprised of a water cooling tank and two powered endless belts which remove the profile from the extrusion line.

The temperature of the extruder barrel from the hopper to the die is controlled in three zones. The temperature in these zones are maintained at 190°C, 195°C, and 210°C, respectively, and the temperature of the die itself is maintained at 187°C.

By using the above-described composition and equipment, a rectangular shape is produced which has an average density of 0.65 g/cm³ at an output rate of 6.0 kg/h. This shape has a dense and smooth non-foamed skin of 1.0 mm thickness on three of its sides which are indicated by the numeral 50 in FIG. 5. The remainder side has only a partially foamed skin of approximately 0.1 mm thickness.

EXAMPLE 14

In order to extrude a cellulose polypropionate foamed rectangular shape the cross section of which is similar to FIG. 5 and having an area of 300 mm², the following composition is prepared in a high speed mixer:

| Component | Parts by Weight |
| --- | --- |
| Cellulose polypropionate pellets (CELIDOR CPH of Bayer) | 100 |
| Paraffin oil (SIDEPALINE 618 of GEERHART and MATTHIS) | 0.5 |
| Azodicarbonamide | 0.5 |

This composition is used in a single screw extruder of 40 mm diameter and 20 diameters length and is extruded through a die the outlet of which is represented by the shaded area shown in FIG. 5 and which has an area of 150 mm² so that the ratio between the cross-sectional area of the die and the foamed profile is 1/2.0.

Immediately after the die and parallel with the direction of extrusion a metallic water-cooled shaper of constant cross section and of 1,000 mm length is placed directly in line with the die. The distance between the outlet edge of the die and the inlet edge of the shaper is 0.1 mm. The walls of the shaper are maintained at a temperature of 30°C. The remainder of the apparatus, after the shaper, is comprised of a water cooling tank and two powered endless belts which remove the profile from the extrusion line.

The temperature of the extruder barrel from the hopper to the die is controlled in three zones. The temperature in these zones are maintained at 135°C, 175°C, and 190°C, respectively, and the temperature of the die itself is maintained at 170°C.

By using the above-described composition and equipment, a rectangular shape is produced which has an average density of 0.65 g/cm³ at an output rate of 7.0 kg/h. This shape has a dense and smooth non-foamed skin of 1.2 mm thickness on three of its sides which are indicated by the numeral 50 in FIG. 5. The remainder side has only a partially foamed skin of approximately 0.1 mm thickness.

It will be understood that many modifications can be made in the performance of the invention described above, without departing from the spirit and scope of the following claims.

We claim:

1. A process for producing an extruded plastic material product comprising the steps of extruding a thermoplastic material with an expanding agent therein through a die outlet, said thermoplastic material being selected from the group consisting of (A) styrene homo and copolymers and styrene derivatives substituted on the ring or in the alpha position, as well as mixtures of said polymers or copolymers with one or more elastomeric compounds, (B) acrylic homo and copolymers, (C) vinyl chloride homo and copolymers, and mixtures thereof with one or more elastomeric compounds, (D) polyolefins, (E) polyamides, (F) polyurethanes, (G), cellulose derivatives, (H) straight chain polyesters, (I) acetal homo and copolymers, (J) polycarbonates, (K) polyethers and (L) polyvinyl ethers and polyvinyl esters, the extruded material having an external surface thereon, feeding the extruded material through an elongated shaper immediately adjacent to the die outlet, the shaper having an internal surface defining a channel, said channel having an inlet and an outlet and said channel inlet circumscribing said die outlet, said shaper channel inlet and said die outlet each having a first side, and a second side opposite said first side, the shaper channel inlet and the die outlet being in close proximity along substantially the entire length of said first side of said shaper inlet and the corresponding side of said die outlet, said second side of the die outlet being substantially removed from the corresponding second side of the shaper inlet within said circumscribed area of said shaper along substantially the entire length of said second sides, thereby to provide for substantially unrestricted expansion of the plastic material extruded through the die within said circumscribing area of the shaper, the external surface of the material extruded through the die outlet immediately making contact with the internal surface of the shaper channel along substantially the entire length of said first side of said shaper inlet, and the channel outlet cross-section being substantially that of the product desired, cooling rapidly the external part adjacent the external surface of the extruded material along substantially the entire length of said first side of said external surface below the solidification point of the material immediately upon being fed into the shaper channel to form a thick skin of higher density along said first side of said external surface, thereby forming a continuous area of thick skin along the external surface of the extruded material adjacent said first side and imparting sufficient mechanical strength to the extruded product in the shaper to permit it to be pulled through the shaper, expanding the extruded material from said continuous area of thick skin towards said second side to substantially fill the channel and forming a continuous surface area substantially free of such a thick skin on the extruded material adjacent said second side of the shaper channel, and pulling the extruded product through the shaper.

2. The process of claim 1 wherein the extruded product is pulled through the shaper by means of endless belts.

* * * * *